US005796644A

United States Patent [19]

Jiang

[11] Patent Number: 5,796,644
[45] Date of Patent: Aug. 18, 1998

[54] FLOATING-POINT MULTIPLY-AND-ACCUMULATE UNIT WITH CLASSES FOR ALIGNMENT AND NORMALIZATION

[75] Inventor: Shao-Kun Jiang, San Diego, Calif.

[73] Assignee: Samsung Electronics Company, Ltd., Rep. of Korea

[21] Appl. No.: 746,828

[22] Filed: Nov. 18, 1996

[51] Int. Cl.$^6$ ........................................ G06F 7/38
[52] U.S. Cl. .......................... 364/748.07; 364/715.04; 364/736.02
[58] Field of Search .................. 364/715.04, 736.02, 364/748.05, 748.07, 750.5, 754.01, 757, 759, 760.01, 760.02, 760.03, 760.04, 760.05, 758

[56] References Cited

U.S. PATENT DOCUMENTS

| | | | |
|---|---|---|---|
| 4,969,118 | 11/1990 | Montoye et al. | 364/748.07 |
| 5,241,493 | 8/1993 | Chu et al. | 364/748.07 |
| 5,471,410 | 11/1995 | Baiey et al. | 364/748.05 X |
| 5,530,663 | 6/1996 | Garcia et al. | 364/748.07 |

Primary Examiner—Chuong Dinh Ngo
Attorney, Agent, or Firm—Skjerven, Morrill, MacPherson, Franklin, and Friel LLP; David T. Millers

[57] ABSTRACT

A floating point multiply-and-accumulate unit that performs an operation $A*B \pm C$ also determines an exponent difference $(Ea+Eb)-Ec$ where Ea, Eb, and Ec are the exponents of values A, B, and C. The exponent difference indicates a class for the operation. In a first class, C is much greater than $A*B$ and accumulation of a mantissa Mc of C with a mantissa $Ma*Mb$ of $A*B$ leaves mantissa Mc. In second and third classes, C and $A*B$ are comparable and mantissas Mc and $Ma*Mb$ overlap during accumulation. In a fourth class, $A*B$ is much greater than C so that accumulation of mantissas Mc and $Ma*Mb$ leaves $Ma*Mb$. The classes controls shift logic for alignment before accumulation or postnormalization after accumulation. For the first class, alignment or normalization are fixed according to Mc. For the second and third class, a fixed shift for alignment or normalization according to $Ma*Mb$ is performed followed by a variable shift as indicated either by the exponent difference or cancellation detected during accumulation. For the fourth class, alignment or normalization are fixed according to $Ma*Mb$. Accordingly, alignment or normalization performs at most a fixed shift followed by are relatively small variable shift, and shift logic can be simpler than is required for arbitrary shifts across an entire shifter.

10 Claims, 6 Drawing Sheets

```
   49      47                               24                                    0
  S_A  S_A S_A S_A S_A S_A S_A ... S_A  A_24 A_23 A_22 A_21 A_20 A_19 ... A_0

S_K  S_K S_K S_K S_K K_24 K_23 ... K_5  K_4 K_3 K_2 K_1 K_0  0  . . . . 0
  S_L  S_L S_L L_24 L_23 L_22 L_21 ... L_3  L_2 L_1 L_0  0  0  0  . . . . 0
+ S_K  M_24 M_23 M_22 M_21 M_20 M_19 ... M_1 M_0  0  0  0  0  0  . . . . 0
```

5,796,644

1

FLOATING-POINT MULTIPLY-AND-ACCUMULATE UNIT WITH CLASSES FOR ALIGNMENT AND NORMALIZATION

BACKGROUND OF THE INVENTION

1. Field of the Invention

This invention relates to digital arithmetic circuits and methods for performing a multiply-and-accumulate operation which determines (A*B)±C.

2. Description of Related Art

A multiply-and-accumulate (MAC) operation combines three values A, B, and C by adding or subtracting one value C from the product of the other values A and B. An arithmetic circuit including a multiplier and an adder can perform such MAC operations in separate steps, multiplying values A and B using the multiplier, rounding the result, and then adding value C to or subtracting value C from the product using the adder. Alternatively, fused MAC units perform portions a multiplication and an accumulation in parallel and omit rounding of the product to improve processing performance (latency and accuracy) of MAC operations.

Hokenek et al., "Second-Generation RISC Floating Point with Multiply-Add Fused," IEEE Journal of Solid-State Circuits, vol. 25, No. 5, October 1990, which is hereby incorporated by reference in its entirety, describes a floating point MAC unit which performs bit alignment for value C in parallel with multiplication of values A and B so that value C is accumulated with product A*B without delay after determination of product A*B. A result A*B±C is accumulated without rounding or truncating intermediate product A*B which could introduce error. Additionally, a leading zero anticipator identifies a shift required to normalize the result A*B±C according for a floating point representation while value C is accumulated with product A*B so that the result A*B±C is normalized immediately after accumulation. Accordingly, a fused MAC unit is generally faster and more accurate than a multiplier and an accumulator used sequentially.

A drawback for fused MAC units is the increase in circuit complexity or size required for performing parallel operations, and fused MAC units which are less complex and/or smaller are sought.

SUMMARY OF THE INVENTION

In an embodiment of the invention, a floating point multiply-and-accumulate (MAC) unit which performs a MAC operation A*B±C also determines an exponent difference (Ea+Eb)−Ec where Ea, Eb, and Ec are the exponents of values A, B, and C. The exponent difference indicates a class for the operation. For the first class, value C is much greater than product A*B and accumulation of a mantissa Mc of value C with a mantissa Ma*Mb of product A*B leaves a result that is substantially the same as mantissa Mc. For the second, third, and fourth classes, value C and product A*B are comparable in size and mantissas Mc and Ma*Mb overlap during accumulation. The second, third, and fourth class are distinguished by the exponent difference being positive, zero, or negative. For the second class, the exponent difference is positive. For the fourth class, the exponent is less than zero. The third class, where the exponent difference is zero, may be treated as a separate class or as a special case of the fourth class. For the fifth class, product A*B is much greater than value C so that accumulation of mantissas Mc and Ma*Mb leaves a result that is substantially the same as mantissa Ma*Mb.

2

Shift logic uses the classes for control of alignment before accumulation and postnormalization after accumulation. For the first class, alignment or normalization are fixed according to mantissa Mc. Alignment loads mantissa into a fixed position where bits of mantissa Mc do not overlap with bits of mantissa Ma*Mb during accumulation. After accumulation, mantissa Mc is in the most significant bit locations of the storage for the result, and mantissa Ma*Mb only provides bits for rounding. The bits from the most significant bit locations are the resulting mantissa and are correctly normalized.

For the second, third, or fourth class, mantissas Mc and Ma*Mb overlap during accumulation. Correct alignment is achieved by a fixed shift that aligns mantissa Mc and Ma*Mb followed by a variable shift by a shift count determined from the exponent difference. The fixed and variable shifts are to the right since mantissa is initially loaded in the left-most position. Normalization for the second class differs from normalization for the third and fourth classes. For the second class, mantissa Mc is more significant than mantissa Ma*Mb, postnormalization shifts the result as required to shift mantissa Mc from the previously aligned position to the most significant bit locations, and the exponent difference indicates the required shift. For the third and fourth class, mantissa Ma*Mb is equal to or greater than mantissa Mc. A fixed shift shifts mantissa Ma*Mb to the most significant bit locations and then a variable shift compensates for accumulation canceling of the most significant bits of mantissa Ma*Mb. A leading zero/one anticipator indicates the required variable shift count for normalization of the third and fourth classes.

For the fifth class, alignment shifts mantissa Mc into a non-overlapping section which is less significant than mantissa Ma*Mb. For normalization, a fixed shift shifts mantissa Ma*Mb to the most significant bit locations, and mantissa Mc provides bit used for rounding. No variable shift is required for normalization because accumulation with mantissa Mc does not cause significant cancellation.

In one embodiment of the invention, a MAC operation includes: determining an exponent difference; identifying a class for the operation based on the exponent difference; generating a product in carry-save form of first and second mantissas; aligning a third mantissa into a first section of a shifter which has first, second, and third sections; and accumulating the aligned third mantissa with the carry and sum terms of the product. During accumulation, the most significant bit location of the second section provides a bit to be accumulated with the most significant bit of the product. For the first class, the third mantissa stays in the first section during accumulation. For the second class, the mantissa is shifted by the amount that is a function of the exponent difference. For the third and fourth classes, the third mantissa is shifted by a fixed amount in the shifter so that a most significant bit of the third mantissa is in the most significant bit location of the second section of the shifter and then by a variable amount selected according to the exponent difference. For the fifth class, the third mantissa is shifted into the third section of the shifter.

An embodiment of an alignment system for the MAC unit, includes: a shifter having a first section and a second section, wherein the first section includes bit locations that are more significant than bits locations in the second section; a circuit for determining and classifying the exponent difference; and a control circuit which for the first class, causes no shift by the shifter, for the second class causes the shifter to perform a variable shift with a shift count that is a function of the exponent difference; for the third and fourth classes, causes the shifter to perform the fixed shift and then a variable shift with a shift count indicated by the exponent difference.

The MAC unit can use the exponent difference determined for alignment when normalizing the resultant mantissa. The result of the accumulation is loaded into a shifter which performs a coarse normalization. For the first class, no renormalization is required. For the second class, the result is shifted by a variable amount equal to the difference between a constant and the exponent difference where the constant is a fixed amount such that a bit originally in a most significant bit location of the second section of the shifter after being shifted by the constant ends up in a most significant bit location of the first section. For the third or fourth class, the result is shifted by a variable amount selected according to a leading zero/one count. The first class is shifted by the constant amount.

An embodiment of a normalization system in accordance with the invention includes: a circuit for determining and classifying an exponent difference; a shifter having first and second sections into which a resultant mantissa is loaded for coarse normalization; a leading zero/one anticipator; and a control circuit. For the first class, the control circuit causes no shift by the shifter. For the second class, the control circuit causes the shifter to perform a variable shift with a shift count that depends on the exponent difference. For the third and fourth classes, the control circuit causes the shifter to perform a variable shift with a shift count that depends on the leading zero/one indicator.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
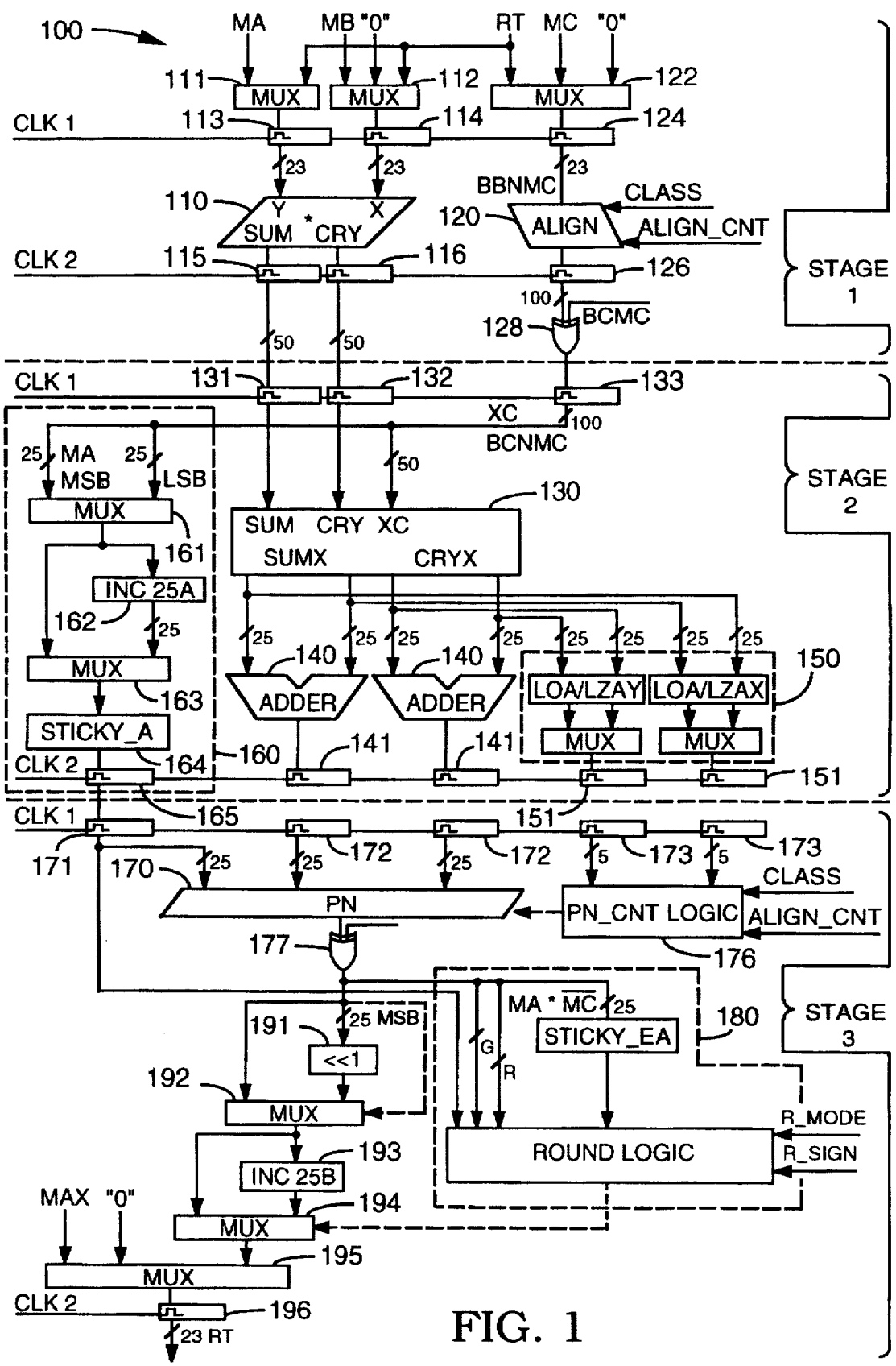
FIGS. 1, 2, and 3 are block diagrams respectively showing a mantissa pipeline, an exponent pipeline, and a sign pipeline for a fused floating point multiply-and-accumulate unit in accordance with an embodiment of the invention.

A fused floating-point multiply-and-accumulate (MAC) unit in accordance with an embodiment of the invention determines a result $A*B \pm C$ using a multiplier, an aligner, and a normalization circuit. The multiplier can be a modified Booth multiplier which either sign extends partial products to the length of the resulting product or sign encodes of the partial products. Sign encoding reduces the amount of adder circuitry required to combine partial products in the multiplier. In either alternative embodiment, the multiplier represents a product $Ma*Mb$ of mantissas Ma and Mb as sum and carry values which are accumulated with a third mantissa Mc that can have a most significant bit (MSB) more significant than the MSB of product $Ma*Mb$. (As used herein, accumulation refers to either addition or subtraction.) Sign-extension circuitry and adder circuitry for the accumulation of bits more significant that the MSB of product $Ma*Mb$ are eliminated by carry correction logic which determines whether the carry out is false (i.e. the result addition of a sign-extended negative value or a sign encoded value) and should be suppressed or is valid and should propagate to more significant bits. An incrementer can increment the bits of Mc which are more significant than the most significant bit of the product $Ma*Mb$ in response to an valid carry out.

The aligner aligns mantissa Mc of value C for accumulation with a product $Ma*Mb$ (the mantissa for product $A*B$) and is simplified by classifying each MAC operation according to the size of value C relative to product $A*B$ as indicated by an exponent difference (Ea+Eb)−Ec where Ea, Eb, are Ec are respective exponents for values A, B, and C. Use of classes simplifies a shifter which shifts mantissa Mc as required for accumulation with mantissa $Ma*Mb$. For each class, the shifter may perform a fixed shift followed by a variable shift. For a first class, mantissa Mc is loaded as the MSBs in the shifter, and no fixed shift or variable shift are performed. Mantissa $Ma*Mb$ provides "sticky" bits for rounding. For the second class, the shifter performs no fixed shift but shifts by a variable amount determined by subtracting the exponent difference from a constant. For third and fourth classes, a fixed right shift aligns mantissa Mc with mantissa $Ma*Mb$ and the variable shift shifts further right by an amount indicated by an exponent difference (Ea+Eb)−Ec. Accumulation combines bits of mantissa Mc with bits from mantissa $Ma*Mb$. A fifth class shifts mantissa Mc to the least significant bits (LSBs) of the shifter with no variable shift, and mantissa Mc provides "sticky" bits which are ignored except for rounding mantissa $Ma*Mb$.

The normalization circuitry is also simplified by classifying each MAC operation according to the size of value C relative to product $A*B$ as indicated by exponent difference (Ea+Eb)−Ec. Classes simplify a shifter in the normalization circuit that shifts a result for a coarse normalization because the shift range is reduced. Again, different classes either require no shift, only a fixed shift, or a fixed shift and a variable shift. The distance shifted in a variable shift is relatively small and depends on the exponent difference or leading zero/one anticipation.

Figure 2:
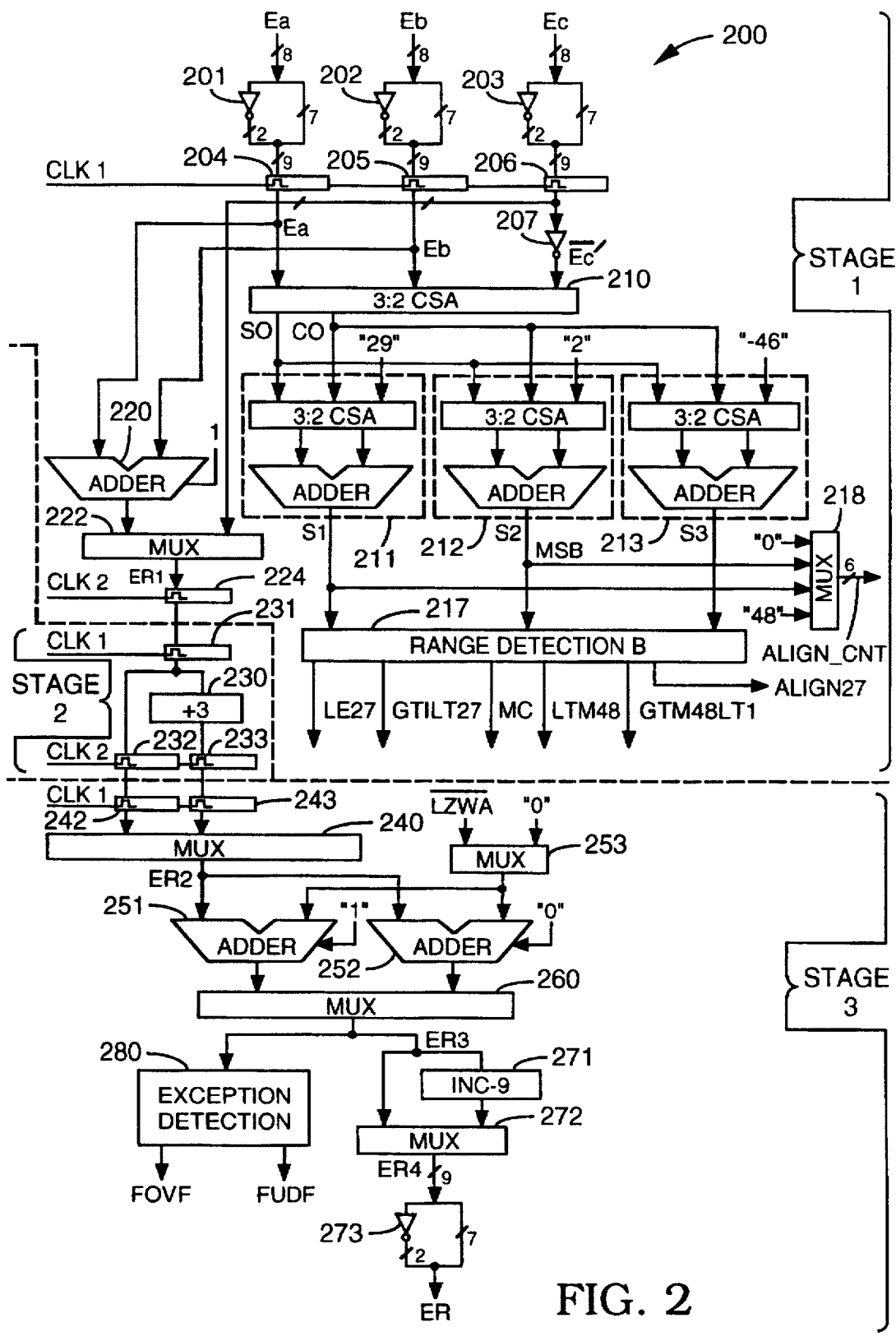
Figure 3:
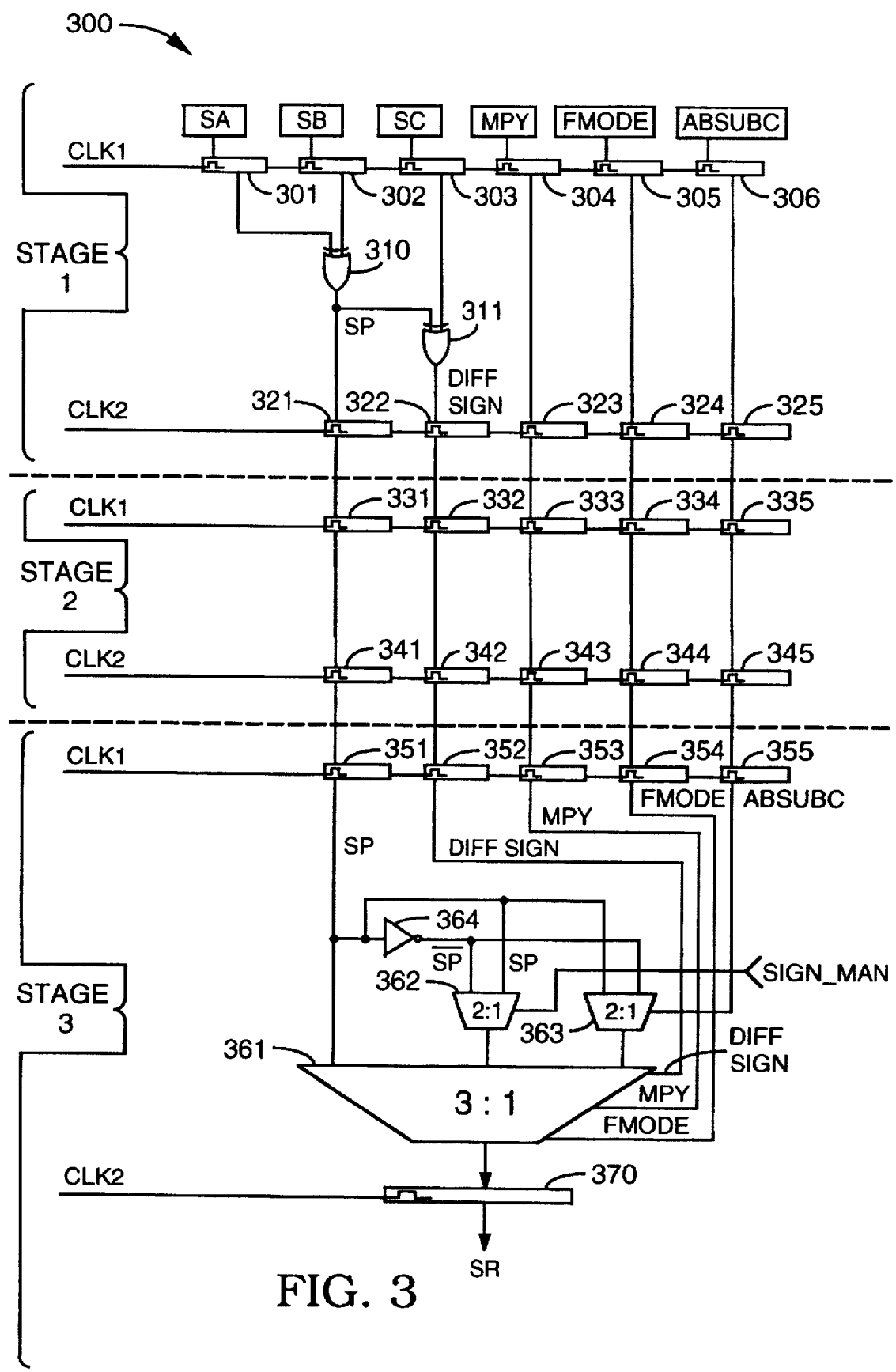

One embodiment of the invention is a fused MAC unit which determines $(A*B) \pm C$ from input signals representing floating point values A, B, and C. Formats for floating point values are well known in the art. For example, the IEEE-754 single precision data type is represented using 32 bits that include one bit indicating a sign, eight bits indicating an exponent, and 23 bits indicating a mantissa. FIGS. 1, 2, and 3 show respective pipelines 100, 200, and 300 for mantissa, exponent, and sign data through an exemplary MAC unit which supports the IEEE-754 single precision data type. Mantissa pipeline 100 multiplies mantissas Ma and Mb for values A and B, adds or subtracts a mantissa Mc for value C, and normalizes a resulting mantissa RT according to IEEE-754 floating point format. Exponent pipeline 200 adds exponents Ea and Eb for values A and B and performs an exponent adjustment based on the results in mantissa pipeline 100. Further, in accordance with an aspect of the invention, exponent pipeline 200 determines exponent differences (Ea+Eb)−Ec and from the exponent differences determines classes for MAC operations. The classes are used in aligning mantissa Mc for accumulation with the product $Ma*Mb$ and in normalization of mantissa result RT as described below. Sign pipeline 300 performs an XOR of sign signals Sa and Sb for values A and B to determine a sign SP for the product A*B and a sign difference DIFF_SIGN between sign SP and a sign Sc of value C. For addition, sign SP is the resultant sign SR unless the sign difference is not zero and the magnitude of value C is greater than the magnitude of the product A*B. For subtraction, sign SP is the resultant sign SR unless the sign difference is zero and the magnitude of value C is greater than the magnitude of the product A*B.

The exemplary MAC unit has three pipeline stages, a latency of three clock cycles, and can complete one MAC operation per clock cycle. Stage 1 determines product Ma*Mb and aligns mantissa Mc for accumulation with product Ma*Mb. Stage 2 accumulates mantissas Mc and product Ma*Mb and performs leading zero or leading one anticipation for normalization of the result of the accumulation. Stage 3 rounds and normalizes the result or detects overflow and underflow exceptions.

As shown in FIG. 1, stage 1 of mantissa pipeline 100 includes a multiplier 110 and an aligner 120 which operate in parallel. Multiplexers 111 and 112 and level trigger latches 113 and 114 select the input signals to multiplier 110. Signals CLK1 and CLK2 are the master and slave clock signals which control latches in the MAC unit. Multiplexer 122 selects the input signal to aligner 120. Input signals MA, MB, "0", RT and MC to mantissa pipeline 100 are in a 23-bit format to represent the mantissa of an IEEE-754 single precision value. Possible input signals to multiplier 110 include signals MA, MB, "0", and RT which indicate mantissa Ma for value A, mantissa Mb for value B, the mantissa for one (1), and mantissa RT which was a previous result from the MAC unit. The 23-bit input signals represent a 24-bit normalized mantissa of the form 1.XXXXXXXXXXXXXXXXXXXXXXX where each X is 1 or 0 according to a corresponding bit from the 23-bit input signal. Accordingly, multiplexer 112 selects 23-bit signal "0" which represents a mantissa value of 1.0 during a floating point addition or subtraction (A*1)±C. Multiplexer 122 selects an input signal from signals RT, MC, and "0" which passes to latch 124 for processing by aligner 120. Signal "0" is selected when using the MAC unit to perform a multiplication A*B±0. In the following, selection of MA, MB, and MC is assumed although there are many other possibilities.

The implied leading 1 and a sign bit 0 are appended to each input signal before multiplier 110 determines the product of two 25-bit signed values. Multiplier 110 can have any desired multiplier architecture for multiplying integers (e.g. mantissas) at least 25 bits in size. Multiplier architectures are well known in the art. In the embodiment of the invention shown in FIG. 1, multiplier 110 generates a product in a single clock cycle and represents the product in the form of sum and carry signals SUM and CRY. Signals SUM and CRY must be added together to generate product Ma*Mb in two's-complement format. Product Ma*Mb should always be positive because mantissas Ma and Mb are positive. Sign pipeline 300 (FIG. 3) processes the signs of the floating point values.

Figure 4:
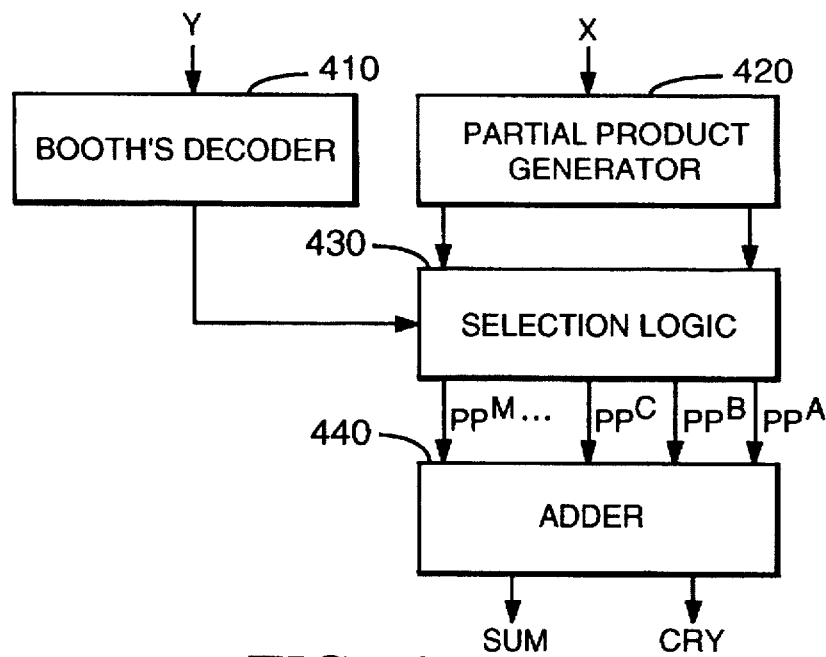
FIG. 4 is a block diagram of a multiplier for the mantissa pipeline of FIG. 1.
Figure 5:
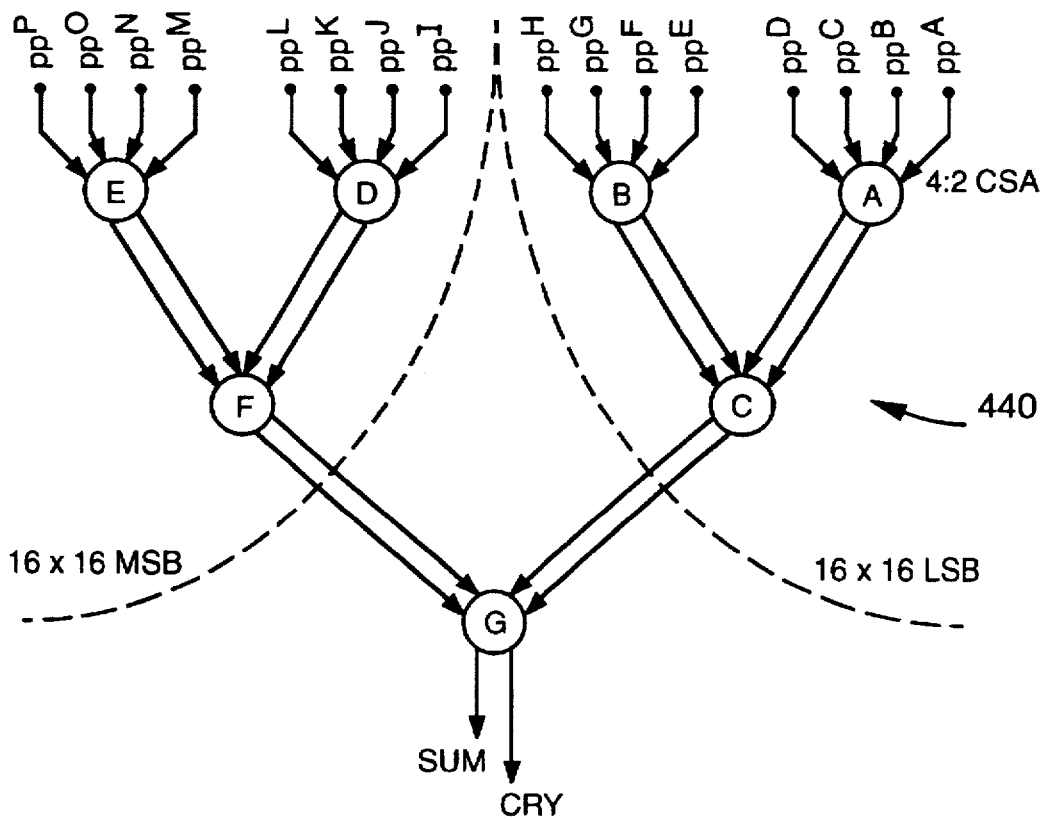
FIG. 5 is a block diagram of an adder for adding partial products in the multiplier of FIG. 4.

FIG. 4 shows an exemplary embodiment of multiplier 110 which includes a Booth decoder 410, a partial product generator 420, selection logic 430, and a carry-save adder 440. Booth decoder 410 in multiplier 110 recodes a multiplier Y while partial product generator 420 generates multiples of multiplicand X by performing shifts and two-complement or sign encoding operations. Selection logic 430 selects partial products ppA to ppM of multiplicand X according to the recoded multiplier Y and provides the selected partial products ppA to ppM to adder 440 for addition. Adder 440 may be a Wallace tree adder such as shown in FIG. 5 which reduces the partial products to two values: the sum and carry values represented by signals SUM and CRY.

Booth decoder 410 and selection logic 430 implement a modified Booth's algorithm which for each pair of bits $Y_{i+1}$, $Y_i$ in multiplier Y where i is even selects one of five multiples of $2^i*X$. The multiple selected for the partial product depends on the values of bits $Y_{i+1}$, $Y_i$, and $Y_{i-1}$ as shown in Table 1.

TABLE 1

| Modified Booth's Decoding | | | |
|---|---|---|---|
| $Y_{i+1}$ | $Y_i$ | $Y_{i-1}$ | Selected Partial Product |
| 0 | 0 | 0 | $0*2^i*X$ |
| 0 | 0 | 1 | $1*2^i*X$ |
| 0 | 1 | 0 | $1*2^i*X$ |
| 0 | 1 | 1 | $2*2^i*X$ |
| 1 | 0 | 0 | $-2*2^i*X$ |
| 1 | 0 | 1 | $-1*2^i*X$ |
| 1 | 1 | 0 | $-1*2^i*X$ |
| 1 | 1 | 1 | $0*2^i*X$ |

For 32-bit signed integers, Booth's decoder 410 and selection logic 430 select up to 16 partial products ppA to ppP which adder 440 adds to generate signals SUM and CRY. Selection of partial product ppA uses a bit $Y_{-1}$ which is always 0. A multiplier Y which is a mantissa according to the IEEE-754 standard is a 24-bit unsigned (positive) value. After addition of a sign bit 0, the mantissas are 25 bit sign values which are sign extended to 26 bits for modified booth decoding. The 26 bit values require 13 partial products ppA to ppM. U.S. patent app. Ser. No. 08/734,277, entitled "Parallel Multiplier that Supports Multiple Numbers with Different Bit Lengths", filed Oct. 21, 1996 describes a multiplier suitable for mantissa pipeline 100 and is incorporated by reference herein in its entirety. The multiplier described in U.S. patent Ser. No. 08/734,277 is configurable as a 32×32 multiplier for multiplying signed integer values up to 32-bit values or as two 16×16 multipliers or four 8×8 multipliers for multiple simultaneous 16-bit or 8-bit integer multiplications.

Figures 6A, 6B, 7:
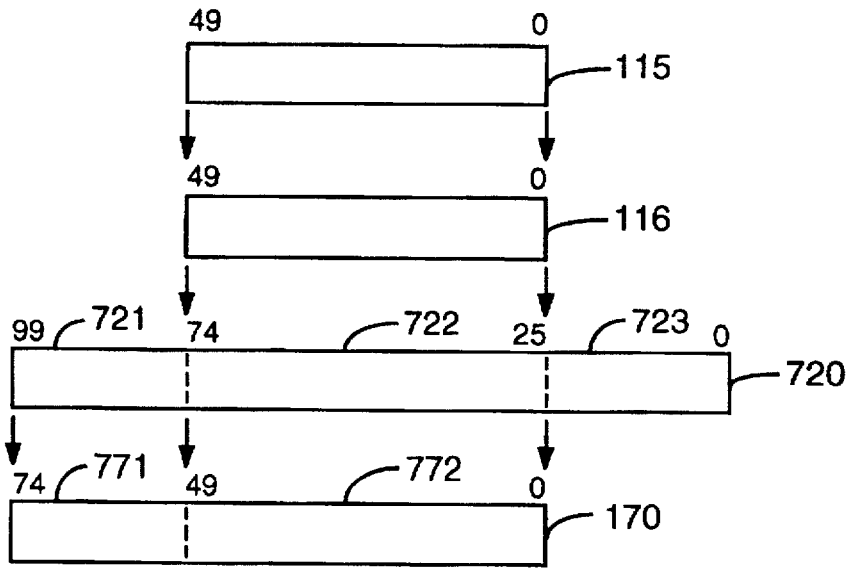
FIG. 6A and 6B illustrate methods for adding partial products in the multiplier of FIG. 4.
FIG. 7 illustrates the relation that bits from the multiplier have with bits from shifters in an aligner and a normalization circuit of the mantissa pipeline.

FIG. 6A illustrates an addition performed by adder 440 in a first alternative embodiment of the invention. In FIG. 6A, bits in partial products ppA to ppM are identified as bits $A_0$ ... $A_{24}$ to $M_0$ ... $M_{24}$ and are multiples of the form $\pm 2*2^i*X$. Bits $S_A$ to $S_M$ indicate the sign bit for partial products ppA to ppM. For multiplication of unsigned 24-bit mantissas, partial product ppM is positive and bit $M_{24}$ is zero. In FIG. 6A, each partial product ppA to ppM is sign extended to 50-bits, the bit-length of the product of two 25-bit sign values.

FIG. 6B illustrates an addition performed by adder 440 in an alternative embodiment of the invention. In this alternative, biases are added to the partial products ppA to ppM so that each partial product ppA to ppM is positive and sign extension is not required. For each partial product, the bias adds 11b to the least significant of the sign bits for partial products ppA to ppL and 1 to the sign bit of partial product ppM. This addition converts the strings of repeated signs $S_A$ to $S_L$ to strings of zeros. The total effect of the bias adds a value containing a series of ones beginning with bit 25 (the bit to the left of $A_{24}$) and extending to bit 49 (the last bit a signed result). An additional term $(1*2^{25})$ is added to the sum so that the net effect of the bias is a carry out from bit 49. The alternative shown in FIG. 6B has the advantage of increasing the number of zero values in the partial products ppA to ppM and simplifying the adder circuitry required in adder 440.

With either alternative embodiment the results from the combination of partial products are 50-bit sum and carry signals SUM and CRY. The result of the multiplication must be positive for mantissa values, but sum or carry signal SUM or CRY can have bit 49 set. Latches 115 and 116 hold values of signals SUM and CRY from multiplier 110 which are passed to latches 131 and 132 in stage 2 of pipeline 100. Each signal SUM and CRY provides a 50-bit value. Each 50-bit value includes the 48 bits which naturally result from multiplying two 24-bit values and two additional bits indicating the sign or encoded sign for signal SUM or CRY.

Simultaneous with multiplication of Ma and Mb, aligner 120 aligns mantissa Mc for accumulation with the product Ma*Mb. Aligner 120 includes a shifter which in the exemplary embodiment of the invention has a 100-bit data width. FIG. 7 illustrates the alignment of bits in shifter 720 with bits from signals SUM and CRY in latches 115 and 116 respectively. In accordance with an aspect of the invention, shifter 720 performs multiple classes of shift operations, each of which includes two separate shifts. The class of shift operation performed depends on a difference δE=Ec−(Ea+Eb) for the exponents Ea, Eb, and Ec of values A, B, and C. Table 2 indicates the five alignment classes.

TABLE 2

| Class | Condition | Fixed Shift | Variable Shift |
|---|---|---|---|
| 1 | δE ≥ 27 | No Shift | No Shift |
| 2 | 27 > δE > 0 | No Shift | Right 27 − δE |
| 3 | δE = 0 | right 27 | No shift |
| 4 | 0 > δE ≥ −48 | right 27 | Right |δE| |
| 5 | −48 > δE | right 27 or right 75 | Right 48 or No Shift |

For Table 2, a 24-bit mantissa Mc is left justified when loaded into section 721 of 100-bit shifter 720 before being shifted according to difference δE and the class for the MAC operation.

For class 1, mantissa Mc remains in section 721. Accumulation with the product does not change the value of mantissa Mc, and mantissa Mc is the mantissa for the result. The product provides sticky bit which may be used in rounding. For classes 2, 3, and 4, mantissa Mc is shifted so that a portion of mantissa Mc and the product overlap. Class 3 can be considered as a special case of class 2 or 4. In class 3, mantissa Mc is shifted right by 27 bits which aligns the most significant bit of mantissa Mc with the first integer bit of the product because bits 48 and 49 of signals SUM and CRY represent sign information. For class 5, mantissa Mc is shifted into section 723 of shifter 720 where mantissa Mc provides sticky bits used in rounding mantissa generated from the product.

Stage 1 of exponent pipeline 200 determines difference δE and generates control signals as required to properly shift mantissa Mc for accumulation during stage 2. Exponents Ea, Eb, and Ec are excess 127 values according to the IEEE-754 format. Inverters 201, 202, and 203 invert and duplicate respective MSBs of 8-bit signals represent exponents Ea, Eb, and Ec to generate a 9-bit signal format which is the two's complement of Ea−1, Eb−1, and Ec−1. Latches 204 and 205 provide the 9-bit signals representing Ea−1 and Eb−1 to two input ports of an adder 210 which in this embodiment is a carry-save adder. An inverter 207 performs a one's complement of the 9-bit signal representing Ec−1 to apply a signal $\overline{Ec}$ representing −Ec to adder 210. Adder 210 generates a sum signal So and a carry signal C0 representing (Ea+Eb)−(Ec+2) or −δE−2. Adders 211, 212, and 213 combine signals S0 and C0 with signals representing 29, 2, and −46 respectively. If δE is greater than 27, a sum S1 from adder 211 is negative. If δE is less than, greater than, or equal to zero, a sum S2 from adder 212 is respectively negative, positive, or zero. If δE is less than −48, a sum S3 from adder 213 is positive.

If δE is less than or equal to 0, range selection circuit 217 asserts a signal ALIGN27 which causes shifter 720 to shift Mc right 27 bits. A multiplexer 218 selects a count for a variable shift. For class 1, the variable shift is zero bits (no shift). For class 2, the variable shift is to the right by 27−δE bits, and sum S1 indicates a count for the shift. For classes 3 and 4, the variable shift is to the right by amount δE, and sum S2 indicates a count for the shift. In class 5, the second shift is a right shift by 48 bits.

Stage 1 of exponent pipeline 200 also includes an adder 220 with a carry in set to "1" which adds the 9-bit signals representing Ea−1 and Eb−1 to generate a signal representing (Ea+Eb)−1/ A multiplexer 222 selects either the signal from adder 220 or the signal representing Ec−1 depending on whether δE is less than or greater than zero. The output signal ER1 from multiplexer 222 is passed through latch 224 to latch 231 in stage 2 of exponent pipeline 200. In stage 2 of exponent pipeline 200, the exponent is incremented and two alternative exponent values ER1 and ER1+3 are passed through latches 232 and 233 to the third stage of exponent stage 200.

The aligned 100-bit mantissa from aligner 120 of mantissa pipeline 100 is stored in a 100-bit latch 126 and from there asserted to a first port of a converter (XOR gate) 128. When the accumulation subtracts value C from product A*B, converter 128 inverts (i.e. performs a one's complement) on the aligned value. Converter 128 then passes the aligned and possibly inverted 100-bit value XC to a latch 133 in stage 2 of pipeline 100.

Stage 2 of mantissa pipeline 100 performs the accumulation of bits aligned with product Ma*Mb from multiplier 110 and passes or increments a portion not aligned with product Ma*Mb. A 3:2 carry-save adder 130 combines 50-bit sum and carry signals SUM and CRY from latches 131 and 132 with matching bits 25 to 74 of signal XC. An adder 140 adds sum and carry signals SUMX and CRYX from adder 130 to generate 50 bits of the result to be passed to stage 3. Adders 130 and 140 must handle an output carry bit which can change bits 75 to 99 of the result. Since product Ma*Mb must be positive even when signal SUM or CRY represents a negative number, a false carry out is generated for cancellation of the sign bit. This false carry should not be combined with bit 75 of signal XC. However, other accumulations generate valid carries which must be combined with bit 75 to obtain a correct result.

Figure 8A:
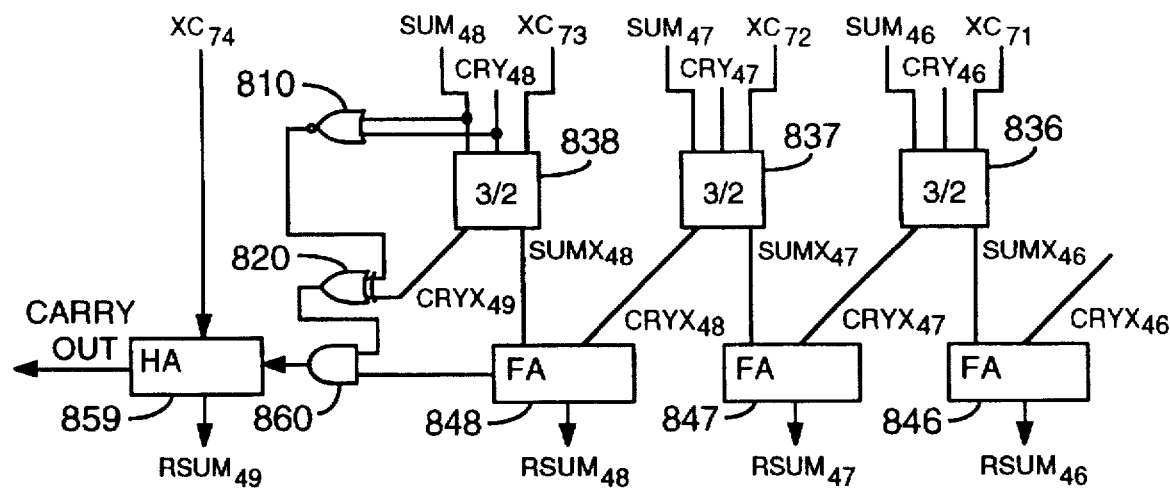
FIGS. 8A, 8B, and 8C are block diagrams of a portion of an adder including carry correction logic in accordance with three alternative embodiments of the invention.

FIG. 8A shows carry correction circuitry in portions of adders 130 and 140 when multiplier 110 generates sum and carry signals SUM and CRY which represent 50-bit signed values as provide by the addition illustrated in FIG. 6A. The portion of adder 130 shown includes three 3:2 carry save adders 836, 837, and 838 which respectively process bits 48, 47, and 46 from signals SUM and CRY and bits 73, 72, and 71 of signal XC. Adder 130 contains similar 3:2 adders for bits 0 to 45 of signals SUM and CRY and bits 25 to 70 signal XC. Adder 130 generates carry and save signals SUMX and CRYX which adder 140 combines to generate a sum RSUM.

The portion of adder 140 shown in FIG. 8A includes three full adders 848, 847, and 846 for bits 48, 47, and 46 of sum RSUM. Adder 140 also contains a half adder 859 for bit 49 of sum RSUM. A half adder is sufficient because the sign bits (bit 49) of signals SUM and CRY are ignored and bit 74 of signal XC is only combined with a possible carry.

If signal CRY or SUM from multiplier 110 represents a negative number, addition of signals CRY and SUM generates a carry out from bit 48 to cancel sign bit 49 for the negative partial sum. However, bit 48 of signal CRY (or SUM) is always equal to the sign bit 49 of signal CRY (or SUM) because 50-bit signals CRY and SUM represent a signed value that results from multiplying two 24-bit unsigned values and therefore contain only 48 bits of significant information. The origin of signals CRY and SUM from the product of two unsigned 24-bit numbers places a number of conditions on bits $CRY_{48}$ and $SUM_{48}$. In particular, at most one of bits $CRY_{48}$ and $SUM_{48}$ is 1 because the result of adding signals CRY and SUM must be positive and adding two negative numbers is negative. If either of bits $CRY_{48}$ and $SUM_{48}$ is 1, adding signals CRY and SUM generates a carry bit 49 to cancel the sign bit of the negative value, and a first carry from bit 48 to bit 49 should be ignored as an artifact of signed arithmetic used in multiplier 110. However, if either of bits $CRY_{48}$ and $SUM_{48}$ is 1, a second carry from bit 48 is a valid carry which should cause bit 49 of the result to be incremented.

In accordance with the invention, logic gates 810 and 820 which are associated with adder 838 control an AND gate 860 so that only the carry bits from adder 848 that are not artifacts of signed arithmetic propagate to adder 859. In the embodiment of FIG. 8A, NOR gate 810 has input terminals coupled to receive signals $SUM_{48}$ and $CRY_{48}$ and an output terminal coupled to an input terminal of XOR gate 820. A second input terminal of XOR gate 820 is coupled to the carry output of adder 838, and an output terminal of XOR gate 820 is coupled to an input terminal of AND gate 860. A second input terminal of AND gate 860 is coupled to receive a carry bit from adder 848, and an output terminal of AND gate 860 is coupled to provide a corrected carry bit to adder 859. If bit $SUM_{48}$ or $CRY_{48}$ is 1 (i.e. if one of signals SUM and CRY represents a negative value), output from NOR gate 810 is 0, and adder 838 asserts a first carry $CRYX_{49}$ if bit $XC_{73}$ is 1. Carry $CRYX_{49}$ when asserted causes XOR gate 820 raise one input terminal of AND gate 860 to 1 so that if adder 848 generates a second carry bit that carry bit propagates through AND gate 860 to adder 859. If both bits $SUM_{48}$ and $CRY_{48}$ are 0 (i.e. if signals SUM and CRY represent positive values), the output signal from NOR gate 810 is 1 which causes the output signal from XOR gate 820 to be 1 because adder 838 does not assert bit $CRYX_{49}$. AND gate 860 propagates the carry bit from adder 848 if generated.

The carry correction logic of FIG. 8A can be varied in a variety of ways. For example, NOR gate 810 can be replaced by an XNOR gate because only one of bits $SUM_{48}$ and $CRY_{48}$ can be 1. Also, signal XC indicates whether there is a carry from adder 130 so that carry correction logic can use, for example, bit $XC_{73}$ instead of carry $CRYX_{49}$ when selecting whether to propagate a carry to adder 859. Additionally, carry correction logic can be applied to propagation of a carry bit from bit 49 (i.e. out of adder 140).

Figure 8B:
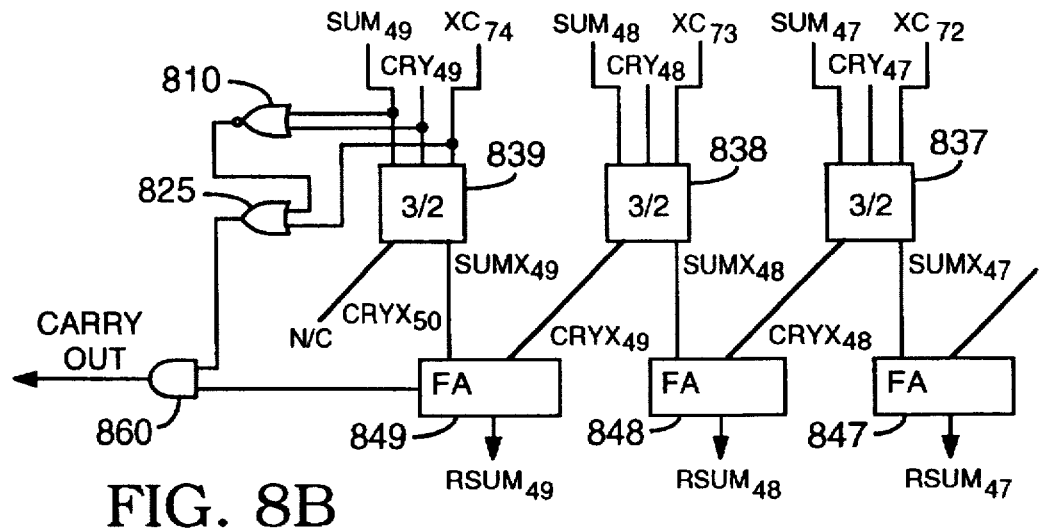

FIG. 8B illustrates embodiment of carry correction logic for correction of a carry out from adder 140. Carry correction logic in FIG. 8B differs from that of FIG. 8A in that the correction logic is connected to adders associated with bit 49 and XOR gate 820 is replaced with an OR gate 825 having an input terminal coupled to receive bit $XC_{74}$ rather than bit $CRYX_{49}$. Carry bit $CRYX_{50}$ from a 3:2 carry save adder 839 is not connected. If bit $SUM_{49}$ or $CRY_{49}$ is 1 (i.e. if one of signals SUM and CRY represents a negative value), output from NOR gate 810 is 0, and the output signal from OR gate 825 is 1 only if signal $XC_{74}$ is 1. Accordingly, if one of signals SUM and CRY represents a negative value, AND gate 860 propagates a carry from adder 849 only if bit $XC_{74}$ is 1 causing a false carry from adder 839. If both bits $SUM_{49}$ and $CRY_{49}$ are 0 (i.e. if signals SUM and CRY represents positive values), the output signal from NOR gate 810 is 1 which causes the output signal from OR gate 825 to be 1, and AND gate 860 propagates a carry from adder 849 if a carry is generated.

If multiplier 110 uses sign corrected partial products such as illustrated in FIG. 6B, addition of signals SUM and CRY can result in a carry from bit 49. Carry correction logic such as shown in FIGS. 8A and 8B also corrects for the carry for sign corrected partial products. For example, if one or both of bits $SUM_{49}$ and $CRY_{49}$ are 1, the first carry from bit 49 should be ignored as an artifact of sign correction and only the second carry should be propagated out of adder 140. If neither bit $SUM_{49}$ nor $CRY_{49}$ is 1, any carry from bit 49 should be propagated out of adder 140. The carry correction logic of FIG. 8B performs exactly this function. The carry correction logic of FIG. 8A can also be used without adder 859 if gates 810, 820, and 860 are coupled to adders 839 and 849 for bit 49 rather than adders 838 and 848 for bit 48.

Figure 8C:
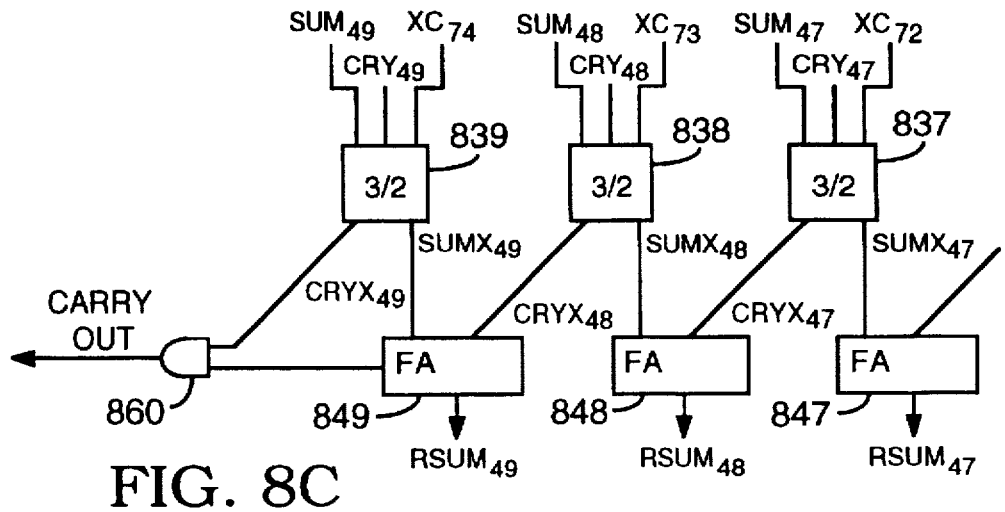

FIG. 8C shows an embodiment of the invention where carry correction logic includes only AND gate 860. This embodiment of the invention is usable with multipliers where the carry out associated with sign correction cannot be generated when combining partial products to create signals SUM and CRY. For a multiplier with a Wallace tree adder such as shown in FIG. 5 a carry out from bit 49 never occurs when generating the sum and carry signals SUM and CRY. With such an adder, at least one of bits $SUM_{49}$ and $CRY_{49}$ is equal to 1, and a false carry is always generated when adding signals SUM, CRY, and XC. AND gate 860 generates an output carry bit only if two carry bits are generated one from adder 839 and one from adder 849.

The corrected carry out may change bits 75 to 99 of signal XC from latch 133. Stage 2 of mantissa pipeline 100 includes a data path 160 for transfer of either the most significant 25 bits or the least significant 25 bits of signal XC to stage 3. In data path 160, a multiplexer 161 selects either the least significant bits or the most significant bits depending on the size of value C relative to product A*B. The most significant bits are selected for alignment classes alignment classes 1 and 2. For classes 3, 4, and 5 accumulation cannot generate a carry out to bit 75, but for alignment classes 1 and 2, a carry out from adder 140 may require that an incrementer 162 increment the most significant bits 75 to 99. For classes 3, 4, and 5, when value Mc is one's complemented by XOR 128, incrementer 162 completes the two's complement conversion. Accordingly, output of multiplexer 161 is coupled to incrementer 162 and to an input of a multiplexer 163. Incrementer 162 calculates adds one to a 25-bit input value from multiplexer 161 and provides the sum to a second input of multiplexer 163. Multiplexer 163 selects the incremented value when there is a carry out bit from adder 140 in class 1 and 2 or when mantissa Mc was one's complemented in classes 3, 4, and 5. Multiplexer 161 selects the least significant bits of signal XC when value C is less than the product A*B, and these least significant bits indicate a value STICKYA for rounding of the result. The selected bits from multiplexer 163 pass through a latch 165 to a latch 171 in stage 3 of the pipeline.

In addition to adders 130 and 140 and the data path 160, stage 2 of mantissa pipeline 100 contains a leading one/zero anticipator 150. Co-owned U.S. patent app. Ser. No. 08/730,922, attorney docket No. M-4408, entitled, "LEADING ZERO COUNT CIRCUIT", filed Oct. 18, 1996, and co-filed U.S. patent app. Ser. 08/746,880, entitled "Combined Leading One and Zero Anticipator" describe a leading zero anticipator and a leading one/zero anticipator suitable for use in pipeline 100. Leading one/zero anticipator 150 anticipates a count LZWA of leading (i.e. consecutive most significant) identical bits in the range corresponding to the product generated by multiplier 110. Count LZWA is stored in latch 151 and from there passes to latch 173 in stage 3 of mantissa pipeline 100.

Stage 3 contains a normalization circuit which includes a shifter 170 and control logic 176. The normalization circuit performs a coarse normalization of the mantissa determined in stage 2. 75 bits from stage 2 are loaded into shifter 170 according to the correspondence illustrated in FIG. 7. In particular, 50 bits from adder 140, latch 141, and latch 172 are loaded into a central section 772 of shifter 170. 25 bits from latch 171 are loaded into section 771 of shifter 170.

According to the IEEE-754 data format the mantissa for the result has a 24-bit normalized form where the most significant bit is an implied 1 and 23 bits represent the fractional portion of the mantissa. Shifter 170 left shifts loaded values until a most significant non-sign bit is aligned with bit 74 of shifter 170. In accordance with an aspect of the invention, MAC operations are divided into normalization classes according to differences δE which is Ec−(Ea+Eb) and shifter 170 performs a shift selected according to the normalization class. Table 3 indicates the normalization classes and a shift count required to properly normalize the resultant mantissa.

TABLE 3

Normalization Classes

| Class | Condition | Normalization Shift Count |
|---|---|---|
| 1 | δE ≥ 27 | No Shift |
| 2 | 27 > δE > 0 | 27 − δE + LZWA |
| 3 | δE = 0 | 27 + LZWA |
| 4 | 0 > δE ≥ −48 | 27 + LZWA |
| 5 | −48 > δE | 27 |

Normalization control logic 176 uses count LZWA, difference δE, and the normalization class for the MAC operation to select the shift required for a coarse normalization. For class 1, value C is much greater than product A*B so that bits in mantissa Mc are effectively the resultant mantissa. Bits in section 772 are less significant than any bit of Mc and are not necessarily in the correct position to indicate their significance relative to mantissa Mc. For this class, the 25 bits in section 721 include mantissa Mc left aligned with bit 99, and no shift is required for normalization.

For normalization class 2, bits from mantissa Mc may be in section 771 but mantissa Mc is not left aligned with bit 99. Bits from multiplier 110 either overlapped and changed the least significant bits in mantissa Mc and are in their correct position relative to bits in mantissa Mc. A carry can from the least significant bits can shift the most significant bit left by one bit. A left shift by 27-δE bits left aligns the most significant bit from mantissa Mc if difference δE is greater than 1. Fine normalization described below accounts for this case. If δE=1, accumulation can cancel the most significant bit of mantissa Mc, and a further shift according to the leading zero/one count is required.

For classes 3 and 4, the most significant bit of mantissa Mc is of less or equal significance to the most significant bit of the product from multiplier 110. If the most significant bit of product Ma*Mb is not changed by accumulation with mantissa Mc, bit 72 in shifter 170 (i.e. bit 47 from latch 172) is the most significant bit of the resulting mantissa and a left shift 27 is required for a coarse normalization. However, cancellation between product Ma*Mb and mantissa Mc can create a run of leading zeros for a positive result or a run of leading ones for a negative result and a further left shift as indicated by count LZWA is required for left alignment in shifter 170.

For class 5, product A*B is much greater than value C so that no significant cancellation can occur. Mantissa Mc can be ignored except possibly for rounding. Bit 72 in shifter 170 (i.e. bit 47 from latch 172) is the most significant bit of the resulting mantissa and a left shift by 27 bits is performed for a coarse normalization.

The 25 most significant bits from shifter 170 after coarse normalization pass from shifter 170 to a converter 177. If the result is negative, converter 177 performs a one's complement to convert the result, and a signal SIGN_MAN is passed to stage 3 of sign pipeline 300 (FIG. 3) to indicate the sign of the mantissa before conversion.

Rounding logic 180 determines from the immediately adjacent bits and from sticky bits whether the mantissa should be incremented (rounded up) or not. A rounding mode signal R_MODE and a rounding sign signal R_SIGN can select the type of rounding performed consistent with the IEEE-754 standard. Rounding logic 180 is not critical to the present invention, and rounding logic 180 can be any type of rounding logic known in the art.

Shift logic 191 shifts the coarsely normalized mantissa left by one bit to remove the implied 1 (most significant bit), and a multiplexer 192 selects either the shifted or unshifted version of the mantissa. In particular, if the MSB of the coarsely normalized mantissa is zero, multiplexer 192 selects the unshifted version since coarse normalization already removed the most significant bit, and a signal is sent to stage 3 of exponent pipeline 200 to indicate exponent correction is required. An incrementer 193 increments the mantissa selected by multiplexer 192, and a multiplexer 194 selects either the incremented value from incrementer 193 or the unincremented value from multiplexer 192 depending on how the mantissa is to be rounded and whether the mantissa was negative before conversion by converter 177. If incrementing causes a carry, a signal is sent to exponent pipeline 200. A final multiplexer 195 selects the output mantissa value RT which is the calculated mantissa from multiplexer 194, a maximum value MAX, or a minimum value "0" if exponent pipeline 200 detects an exponent overflow or underflow.

Stage 3 of the exponent pipeline 200 includes a first multiplexer 240 with an output signal ER2 which is exponent value ER1 if the MAC operation is class 1 or 2 or ER1+3 if the MAC operation is class 3, 4, or 5. To correct for cancellation that accumulation causes for normalization classes 3, 4, and 5, a multiplexer 253 selects the inverse of count LZWA from latch 173, and adders 251 and 252 subtract count LZWA from exponent ER2. For normalization classes 1 and 2, multiplexer 253 selects "0", and adders 251 and 252 add 0 to exponent ER2. Adders 251 and 252 differ in that adder 251 has an input carry and generates a sum one greater than the sum generated by adder 252.

Multiplexer 260 has an output signal ER3 selected from the output signals of adder 251 or 252 according to whether fine normalization in the mantissa pipeline 100 selects the output value from shift logic 191. An incrementer 271 corrects the exponent when incrementer 193 caused a carry. An inverter 273 convert ER3 from the two's complement format to the excess 127 format required for exponents under the IEEE-754 data type. Exception detection logic 280 detects exponent underflow and overflow conditions.

FIG. 3 shows sign pipeline 300. Stage 1 of sign pipeline 300 includes input latches 301 to 306, XOR gates 310 and 311, and output latches 321 to 325. Input latches 301, 302, and 303 store respective sign bits SA, SB, and SC of values A, B, and C. Input latches 304, 305, and 306 store signals MPY, FMODE, and ABSUBC respectively indicating a multiply operation, that the MAC unit is operating in difference mode (i.e. adding when signs for A*B and C differ or subtracting when signs for A*B and C are the same), and whether accumulation subtracts value C from product A*B. XOR gate 310 has input terminals coupled to latches 301 and 302 and generates a signal SP which is 0 if product A*B is positive and 1 if product A*B is negative. XOR gate 311 has input terminals coupled to latch 303 and the output terminal of XOR gate 310 and generates a signal DIFF_SIGN which is 0 (or 1) if product A*B and value C have the same sign (or not). Output latches 321 to 325 pass signals SP, DIFF_SIGN, MPY, FMODE, and ABSUBC to stage 2.

Stage 2 of sign pipeline 300 contains input latches 341 to 345 and output latches 341 to 345 which pass signals SP, DIFF_SIGN, MPY, FMODE, and ABSUBC to input latches 351 to 355 in stage 3 in synchronization with progress of the MAC operation through pipelines 100 and 200. In stage 3, multiplexers 361 to 363 select resultant sign SR which is either signal SP or signal $\overline{SP}$, which is the complement of signal SP. Multiplexer 361 selects signal SP if FMODE and DIFF_SIGN are zero, selects an output signal from multiplexer 362 if FMODE is equal to 1, and selects and output signal from multiplexer 363 if FMODE is not equal to 1.

Although the invention has been described with reference to particular embodiments, the description is only an example of the invention's application and should not be taken as a limitation. In particular, even though much of preceding discussion was aimed at the IEEE-754 data format, alternative embodiments of this invention apply to other floating point data formats. For the other formats, bit positions described for the exemplary embodiment vary in a manner which will be well understood in the art. Various other adaptations and combinations of features of the embodiments disclosed are within the scope of the invention as defined by the following claims.

I claim:

1. A method for performing a multiply-and-accumulate operation on first, second, and third values, comprising:

determining an exponent difference indicating a sum of a first exponent for the first value and a second exponent for the second value minus a third exponent for the third value;

identifying from the exponent difference whether the operation is in a first class, a second class, or a third class;

generating a first signal representing a product of a first mantissa for the first value and a second mantissa for the second value;

loading a third mantissa for the third value into a first section of a shifter which has a first section, a second section, and a third section, the second section having a most significant bit location corresponding to a most significant bit of the first signal; and accumulating the first signal with an output signal from the shifter, wherein during accumulation, the most significant bit location of the second section provides a bit accumulated with the most significant bit of the first signal, wherein:

in response to the operation being in the first class, the third mantissa is associated with the first section of the shifter during accumulation;

in response to the operation being in the second class, the method further comprises shifting the third mantissa by a fixed amount in the shifter so that a most significant bit of the third mantissa is in the most significant bit location of the second section of the shifter, and then shifting the third mantissa by a variable amount selected according to the exponent difference; and in response to the operation being in the third class, the method further comprises shifting the third mantissa into the third section of the shifter.

2. The method of claim 1, wherein the first section of the shifter includes a most significant bit location of the shifter, and the second section of the shifter includes a least significant bit location of the shifter.

3. An alignment system for a floating point multiply-and-accumulate unit, comprising:

a shifter having a first section and a second section, wherein the first section includes bit locations that are more significant than bits locations in the second section, the shifter further comprising:

an input port for loading a mantissa into the first section;

first shift circuit for performing a fixed shift on a mantissa stored in the first section, wherein the fixed shift transfers a bit from a most significant bit location in the first section to a most significant bit location in the second section; and second shift circuit for performing a variable shift on a mantissa in the second section;

a circuit for determining and classifying an exponent difference which is the sum of a first exponent for a multiplier and a second exponent for a multiplicand minus a third exponent associated with the mantissa; and a control circuit for the shifter which in response to the exponent difference being in a first class, cause no shift by the shifter, in response to the exponent difference being in a second class, causes the shifter to perform the fixed shift and then the variable shift with a shift count indicated by the exponent difference.

4. The alignment system of claim 3, wherein the shifter further comprises a third section which includes bit locations less significant than the bit locations in the second section, and wherein in response to the exponent being in a third class, control circuit cause the shifter to shift the mantissa into the third section of the shifter.

5. A method for normalizing a mantissa that results from a multiply-and-accumulate operation, the method comprising:

determining an exponent difference indicating the sum of a first exponent for a first value and a second exponent for a second value minus a third exponent for a third value;

identifying from the exponent difference whether the multiply-and-accumulate operation is in a first, second, or third class;

determining a count of leading bits of the same value in the mantissa; and loading the mantissa into a shifter, wherein the shifter has a first section and a second section, the second section having a most significant bit corresponding to a most significant bit generated by a multiply during the multiply-and-accumulate operation, wherein:

in response to the operation being in the second class or third class, the method further comprises shifting the third mantissa by a fixed amount in the shifter so that a bit originally in a most significant bit location of the second section of the shifter is shifted to a most significant bit location of the first section; and in response to the operation being in the third class, the method further comprises shifting the mantissa by a variable amount selected according to the count.

6. The method of claim 5, further comprising passing a value out of the shifter for fine normalization and rounding, wherein in response to the operation being in the first class, the mantissa is not shifted in the shifter between loading and passing the value out of the shifter.

7. The method of claim 5, wherein the first section of the shifter includes a most significant bit location of the shifter.

8. The method of claim 5, in response to the operation being in the second class, the method further comprises shifting the mantissa by a variable amount selected according to the exponent difference.

9. A normalization system for a floating point multiply-and-accumulate unit, comprising:

an arithmetic circuit for determining and classifying an exponent difference which is the sum of a first exponent for a first value and a second exponent for a second value minus a third exponent for with a third value; and a shifter having a first section, a second section, and an input port, wherein the input port is coupled for loading into the first and second sections a value indicating a mantissa for a result of accumulating the third value with a product of the first and second values, and wherein the first section includes bit locations that are more significant than bits locations in the second section;

a leading zero/one anticipator;

a control circuit coupled to the arithmetic circuit, the shifter, and the leading zero/one anticipator, wherein in response to the exponent difference being in a first class, the control circuit causes no shift by the shifter, in response to the exponent difference being in a third class, the control circuit causes the shifter to perform fixed shift that transfers a bit from a most significant bit location in the second section to a most significant bit location in the first section and then to perform the variable shift with a shift count indicated by the leading zero indicator.

10. The system of claim 9, wherein in response to the exponent difference being in a second class, the control circuit causes the shifter to perform fixed shift that transfers a bit from a most significant bit location in the second section to a most significant bit location in the first section; and then the variable shift with a shift count indicated by the exponent difference.

* * * * *

UNITED STATES PATENT AND TRADEMARK OFFICE
CERTIFICATE OF CORRECTION

PATENT NO. : 5,796,644
DATED : August 18, 1998
INVENTOR(S) : Shao-Kun Jiang

It is certified that error appears in the above-identified patent and that said Letters Patent is hereby corrected as shown below:

```
On the title page, item [54] and column 1, the title should read
--MULTIPLY-AND-ACCUMULATE--.
```

Signed and Sealed this

Sixteenth Day of February, 1999

Attest:

Attesting Officer

*Acting Commissioner of Patents and Trademarks*